J. RAU.
PROCESS AND MACHINE FOR MAKING HOLLOW GLASSWARE.
APPLICATION FILED SEPT. 28, 1916.
1,292,051.
Patented Jan. 21, 1919.
2 SHEETS—SHEET 2.
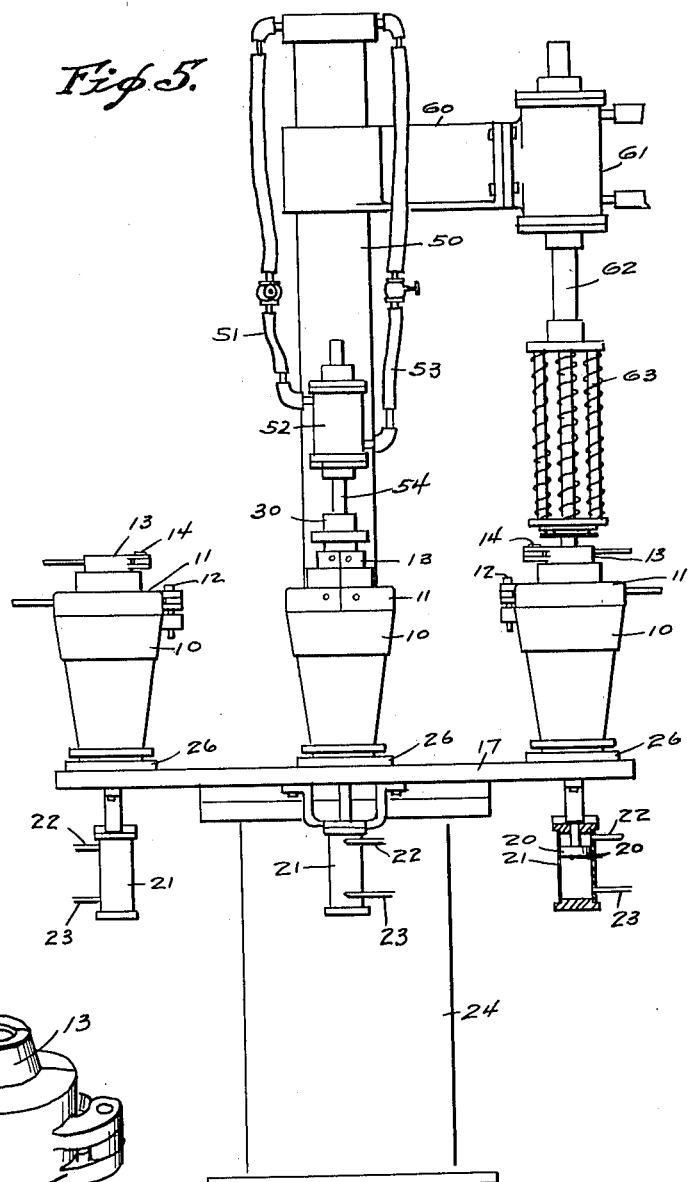
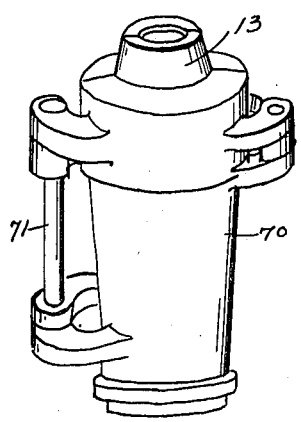
INVENTOR
John Rau
BY
*Lockwood & Lockwood*
ATTORNEYS

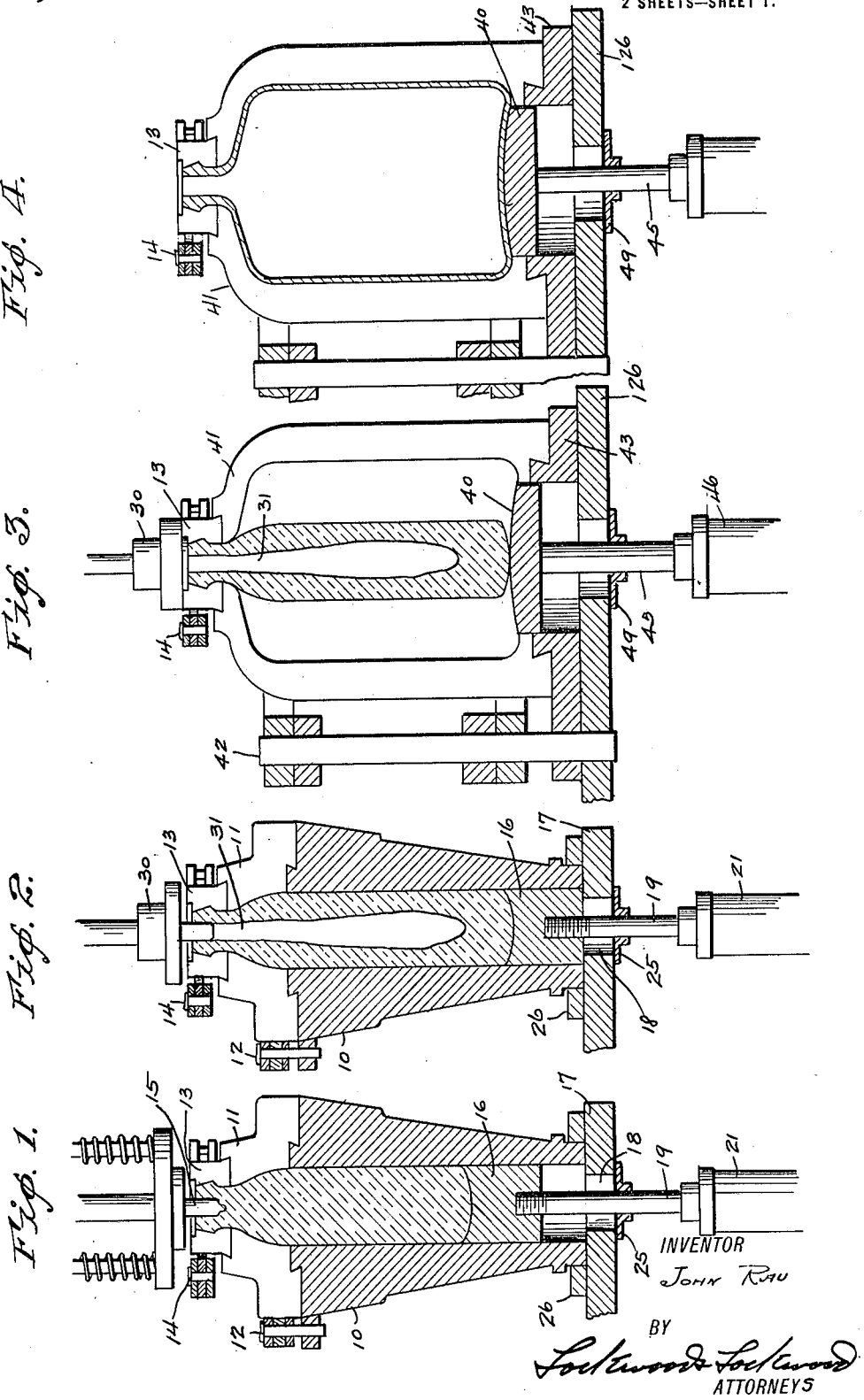

UNITED STATES PATENT OFFICE.

JOHN RAU, OF INDIANAPOLIS, INDIANA.

PROCESS AND MACHINE FOR MAKING HOLLOW GLASSWARE.

1,292,051. Specification of Letters Patent. Patented Jan. 21, 1919.

Application filed September 28, 1916. Serial No. 122,751.

*To all whom it may concern:*

Be it known that I, JOHN RAU, a citizen of the United States, and a resident of Indianapolis, county of Marion, and State of Indiana, have invented a certain new and useful Process and Machine for Making Hollow Glassware; and I do hereby declare that the following is a full, clear, and exact description thereof, reference being had to the accompanying drawings, in which like letters refer to like parts.

The object of this invention is the improvement in the manufacture of large hollow glassware, like five, ten and fifteen gallon glass bottles, demijohns, carboys, jars and the like.

One feature of the invention is the process and means for forming a glass blank in the press or blank mold which has the same length as the finished article after it is blown. With this invention one is enabled to make a very large blank or one having considerable bulk or weight and capable of forming a very large article of hollow glassware. During the final blowing of the article, the glass blank does not have to move downward, descend or elongate, but it merely spreads laterally and naturally until it fills the blow mold.

Another feature of the invention consists in holding the bottom of the glass blank prior to the insertion thereof in or inclosure by the blow mold. This is done by a movable bottom being brought up into touch with the bottom of the blank before it is surrounded by the blow mold and during movement of the blow mold into position around the blank. This feature of the invention is of value in making large hollow glassware because it enables a large blank to be formed and maintains a blank in proper position and condition after the removal of the press or blow mold and during the inclosure thereof by the blow mold, and during such part of the operation prevents deformation or injury to the blank.

Still another feature of the invention consists in the process and means for forming the blank wherein a movable bottom is employed in the blank mold, first for forming a solid blank and then lowered or moved downward during the subsequent blowing of the blank in the press or blank mold for forming the blow opening and particularly for elongating the blank so that it will have the same length as the finished article.

This is done by using a movable bottom rather high up in the press or blank mold during the first part of the process of forming the blank and lowering said bottom during the blowing of the blank in the press or blank mold so as to get the desired length of the blank. The volume of air introduced into the blank when it is elongated and, therefore, the capacity of the air chamber in the blank equals the extent of the elongation of the blank and, therefore, the increase in the capacity of the chamber in the blank mold is due to the downward movement of the movable bottom in the blank mold, when the blank is being blown to elongate it without increasing its diameter.

The full nature of the invention will be understood from the accompanying drawing and the following description and claims.

In the drawings, Figure 1 is a central vertical section of a blank mold and associated parts with a glass blank in solid form at the end of the first step in the process of forming the blank. Fig. 2 is the same with the parts in position at the conclusion of the second step in the process of forming the blank, a blow head having been substituted for the plunger. Fig. 3 is a central vertical section through the mechanism for blowing the glass blank into the finished article, the parts being in position when the mold first incloses the blank. Fig. 4 is the same after the article is fully blown. Fig. 5 is an elevation of the part of a machine in which said novel process and means are employed, the remaining parts of the machine being omitted. Fig. 6 is a perspective view of a different form of press or blank mold from that shown in Figs. 1 and 2.

The first step in the process consists in forming a solid blank, as shown in Fig. 1. There is a unitary press or blank mold 10, as it is not formed of a plurality of vertical sections hinged together, but is one single casing. Upon it there is a neck mold 11 formed of two halves hinged at 12. Above it there is a lift-over 13 formed of two halves hinged together at 14. A usual plunger construction is shown for operating a plunger 15 for forming an opening in the mouth of the blank. There is moved up into the lower part of the press mold a movable bottom 16 which has the same diameter as the inner chamber of the lower and main portion of the mold.

The molds are carried on and revolved by a revoluble table 17 having openings 18 in the same registering with the openings in the bottoms of the press molds so that the movable bottoms can be lowered below the press or blank molds, if desired. The mold is carried on a plunger rod 19 on a plunger 20 operating in an air or liquid cylinder 21 which has in its upper end an exhaust port 22 and connected with its lower end a tube 23 for the inlet of air or other fluid under pressure. The function of this air cylinder is to raise the movable bottom in the blank mold, but it is immaterial what means is employed for this purpose as there are several well known ways. The drawings herein do not disclose the entire air structure, but it is understood that an air structure or supply means is employed which is capable of being used in connection with a rotary table, as the air cylinders revolve about the column 24 on which the table is mounted. Some means, such as the stop bar 25, is employed for limiting the upward movement of the bottom 16 into the press or blank mold. As herein shown, the bar 25 is mounted on the plunger rod 19 so that it will engage the bottom of the table and be stopped thereby. This bar 25 is adjustable on the rod 19 by means of a set screw so that the elevation of the movable bottom 16 may be predetermined. A ring 26 is secured on the table for surrounding and centering the lower end of the blank mold.

The movable bottom is elevated in the press or blank mold and the mold is filled with a charge of glass, and then pressed therein, as shown in Fig. 1. This makes a short solid blank. Then the plunger mechanism is removed and the blow head 30 substituted for the plunger for partially blowing the blank for forming therein a blow opening 31, but chiefly for elongating the blank so that it will be as long as the article to be formed. As the blank is being partially blown in the blank mold, the bottom descends to the table as shown in Fig. 2, that is, to the position which will leave the blank substantially the same length as the article to be formed.

After the blank has been formed, as shown in Fig. 2, the blank is removed from the press mold, either by removing the blank or removing the blank mold, and then a movable bottom 40 is brought up into position to engage the bottom of the blank and hold it until it is surrounded by the blow mold. In the mechanism herein shown to illustrate the general nature of the invention, the blank is lifted out of the press or blank mold by the lift-over and moved between the two open halves of the blow mold 41 which are pivoted on a rod 42 secured to the table and resting upon a base plate 43 on the table. The bottom 40 engages and holds the lower end of the blank until the blow mold entirely incloses it and also during the final blowing operation. For after the blank is inclosed by the blow mold, air is introduced through the blow head 30 and the article finally blown, the movable bottom 40 remaining stationary during the blowing in the blow mold, as it is needless for the bottom to descend since the blank is already as long as the finished article. During the blowing in this invention, the glass spreads with substantial equality in all directions and elongation of the blank or glass during the blowing thereof in the blow mold is avoided.

For the foregoing purpose, the diameter of the movable bottom 40 is not very material as it may be considerably less than that shown since its only function is to hold the bottom of the blank before and during the blowing thereof in the blow mold. Said movable bottom 40 is carried by a plunger rod 45 operating in an air or fluid cylinder 46 which may have an exhaust port 47 at the top and an air supply 48 at the bottom, substantially the same as the cylinders 21. The upward movement of the movable bottom 40 is limited by a bar 49 which is secured to the plunger rod 45 and engages the bottom of the table 26 on the upward movement of the bottom and stops the bottom so that its upper surface will conform properly with the bottom surface of the blow mold.

This invention is not limited to any particular construction of the other parts of the machine, but there is shown herein, in Fig. 5, a centrally located tubular air column 50 extending above the table 26 and to which air under pressure is supplied from some source, not shown, and from which a tube 51 leads to the upper part of a blow head cylinder 52 and a tube 53 leads to the lower part thereof. There is a plunger, not shown, in the cylinder 52, mounted on a tube 54 which carries the blow head 30. The valve mechanism for regulating the air for this part of the machine is not shown.

An arm or bracket 60 extends from the column 50 and carries a cylinder 61 in which there is a plunger, not shown, on a rod 62 which carries the plunger mechanism 63. This part of the machine may be made and operated, substantially as in glass machines heretofore.

While a solid press or blank mold is shown and is used preferably, the invention is not limited to the use of such press mold, but it may be formed of two halves 70 hinged together on a rod 71, as shown in Fig. 6.

The process as well as the operation of the means here shown for carrying out said process will be understood from the foregoing description. But it may be summarized as follows:

A short solid glass blank is first formed. Then the glass blank is elongated by blowing some air into the same so that it will be as long as the article to be formed. This is accomplished by using a movable bottom in the blank mold. In the third place, the blank is placed in or surrounded by a blow mold prior thereto the lower end of the blank is held from further elongation or other distorting movement. This is done by a movable bottom capable of use in the bottom of the blow mold. In the fourth place, the article is finally blown and the bottom of the blank or article is held by said movable bottom during the blowing and does not yield or move downward during such final blowing in the blow mold.

The invention claimed is:

1. In the process of making hollow glassware, making a blank shorter than the article to be formed therefrom, in a mold, thereafter blowing into said blank while in said mold and yieldingly supporting the bottom of the blank so that the blank will be elongated and made the length of the finished article, and blowing the blank into the finished article.

2. In the process of making hollow glassware, making a blank shorter than the article to be formed therefrom, forming the blank in a mold, thereafter blowing into said blank while in said mold and yieldingly supporting the blank so that the blank will be elongated and made the length of the finished article, separating the blank and mold from each other and inclosing the blank in a blow mold, and holding the lower end of said blank in the blow mold and maintaining it in such position prior to the inclosure of the blank by the blow mold and during the blowing operation of the mold.

3. In a machine for making hollow glassware, a blank mold, a movable bottom therein, a plunger for forming the upper end of the blank whereby a blank of solid glass is formed shorter than the finished article, means for introducing air under pressure in said blank while in the blank mold, means for permitting the bottom to yield whereby the blank will be elongated until it has the same length as the finished article, a blow mold for making the finished article adapted to inclose the blank after the blank is separated from the blank mold, a bottom for the blow mold adapted to engage the bottom of the blank before it is inclosed by the blow mold and during the blowing of the blank in the blow mold, and means for blowing the blank in said blow mold to form the finished article.

4. In a machine for making hollow glassware, a blank mold, a movable bottom therein, a plunger for forming the upper end of the blank whereby a blank or solid glass is formed shorter than the finished article, means for introducing air under pressure in said blank while in the blank mold, means for permitting the bottom to yield whereby the blank will be elongated until it has the same length as the finished article, a blow mold for making the finished article adapted to inclose the blank after the blank is separated from the blank mold, a bottom movable up in the lower part of the blow mold and flush with the lower part thereof and adapted to engage the lower part of the blank and hold it before it is inclosed by the blow mold and remain stationary during the blowing operation, and means for blowing the blank in said blow mold to form the finished article.

In witness whereof, I have hereunto affixed my signature.

JOHN RAU.